United States Patent
Tam et al.

(10) Patent No.: US 12,489,209 B2
(45) Date of Patent: Dec. 2, 2025

(54) RECONFIGURABLE INTELLIGENT SURFACE ARCHITECTURE WITH RFID ARRAY

(71) Applicant: NXP USA, Inc., Austin, TX (US)

(72) Inventors: Sai-Wang Tam, Sunnyvale, CA (US); Peter Thüringer, Graz (AT); Rui Cao, Sunnyvale, CA (US); Franz Amtmann, Graz (AT); Daniel Lopez-Diaz, Graz (AT); Yoganathan Sivakumar, Graz (AT); Ulrich Andreas Muehlmann, Graz (AT); Randy Ping Leong Tsang, San Carlos, CA (US)

(73) Assignee: NXP USA, Inc., Austin, TX (US)

( * ) Notice: Subject to any disclaimer, the term of this patent is extended or adjusted under 35 U.S.C. 154(b) by 322 days.

(21) Appl. No.: 18/298,144

(22) Filed: Apr. 10, 2023

(65) Prior Publication Data
US 2024/0339754 A1 Oct. 10, 2024

(51) Int. Cl.
*H01Q 3/46* (2006.01)
*H01Q 1/22* (2006.01)
*H01Q 3/34* (2006.01)

(52) U.S. Cl.
CPC .......... *H01Q 3/46* (2013.01); *H01Q 1/2291* (2013.01); *H01Q 3/34* (2013.01)

(58) Field of Classification Search
CPC ........... H01Q 3/46; H01Q 1/2291; H01Q 3/34
USPC .......................................................... 342/372
See application file for complete search history.

(56) References Cited

U.S. PATENT DOCUMENTS

| | | | | |
|---|---|---|---|---|
| 9,252,860 B1* | 2/2016 | Lee | ...................... | H04B 7/0617 |
| 10,262,172 B1* | 4/2019 | Niranjayan | ......... | G06K 7/10326 |
| 2022/0327295 A1* | 10/2022 | Mei | .................. | G06K 19/07749 |
| 2023/0370122 A1* | 11/2023 | Gunzelmann | ...... | H04B 7/04013 |
| 2025/0062793 A1* | 2/2025 | Bedewy | .................... | H01Q 3/46 |

FOREIGN PATENT DOCUMENTS

| | | | | |
|---|---|---|---|---|
| CN | 113965227 A | * | 1/2022 | |
| CN | 115395242 A | * | 11/2022 | |
| DE | 102013219477 A1 | * | 3/2015 | ........... H05K 13/028 |
| WO | 2023010309 A1 | | 2/2023 | |

OTHER PUBLICATIONS

Vardakis, Iosif et al.: "Intelligently Wireless Batteryless RF-Powered Reconfigurable Surface", 2021 IEEE Global Communications Conference (GLOBECOM), IEEE, Dec. 7, 2021, pp. 1-6.
(Continued)

*Primary Examiner* — Harry K Liu

(57) ABSTRACT

A scalable reconfigurable intelligent surface (RIS) includes a plurality of RIS elements. The RIS elements include: a radio frequency identification (RFID) chip that powers the RIS element; a RFID antenna connected to the RFID chip; a RIS variable impedance controlled by the RFID chip; and a RIS antenna connected to the RIS variable impedance. The plurality of RIS elements produces a reflection beam that may be directed to a specific location. The RFID chip receives steering information to steer the reflection beam.

20 Claims, 6 Drawing Sheets

(56) References Cited

OTHER PUBLICATIONS

E. Martini and S. Maci, "Theory, Analysis, and Design of Metasurfaces for Smart Radio Environments," in Proceedings of the IEEE, doi: 10.1109/JPROC.2022.3171921.

C. Liaskos et al., "Software-Defined Reconfigurable Intelligent Surfaces: From Theory to End-to-End Implementation," in Proceedings of the IEEE, doi: 10.1109/JPROC.2022.3169917.

Y. Liu et al., "Reconfigurable Intelligent Surfaces: Principles and Opportunities," in IEEE Communications Surveys & Tutorials, vol. 23, No. 3, pp. 1546-1577, thirdquarter 2021, doi: 10.1109/COMST.2021.3077737.

X. Pan, F. Yang, S. Xu and M. Li, "A 10 240-Element Reconfigurable Reflectarray With Fast Steerable Monopulse Patterns," in IEEE Transactions on Antennas and Propagation, vol. 69, No. 1, pp. 173-181, Jan. 2021, doi: 10.1109/TAP.2020.3008623.

Rao, Junhui; Zhang, Yujie; Tang, Shiwen; Li, Zan; Shen, Shanpu; Chiu, Chi Yuk; et al. (2022): A Novel Reconfigurable Intelligent Surface for Wide-Angle Passive Beamforming. TechRxiv. Preprint. https://doi.org/10.36227/techrxiv.19755034.v2.

A.El Alami, et al., "Design and Simulation of RFID Array Antenna 2×1 for Detection System of Objects or Living Things in Motion," Procedia Computer Science 151, 2019, Leuven, Belgium, pp. 1010-1015.

Byron Spice, "RFID Tag Arrays Track Body Movements, Shape Changes," Carnegie Mellon University News, Dec. 18, 2018, https://www.cmu.edu/news/stories/archives/2018/december/rfid-tag-tracking.html.

Linglong Dai et al., "Reconfigurable Intelligent Surface-Based Wireless Communications: Antenna Design, Prototyping, and Experimental Results," in IEEE Access, doi: 10.1109.ACCESS.2020.2977772.

Dianhan Xie et al., "3D Passive Positioning Based on RFID Tag Array," IEEE Conference Publication, DOI: 10.1109/ICC.2019.8762086, Jul. 15, 2019.

\* cited by examiner

RECONFIGURABLE INTELLIGENT SURFACE ARCHITECTURE WITH RFID ARRAY

FIELD OF THE DISCLOSURE

Various exemplary embodiments disclosed herein relate to a scalable reconfigurable intelligent surface architecture with RFID array.

BACKGROUND

Range or coverage extension is of common interest for wireless communications. For example, for Wi-Fi communication, obstacles may limit the effectiveness of Wi-Fi communication. Devices using Wi-Fi communication have greatly increased including for example, surveillance cameras, drone control/camera, mobile devices, computers, internet-of-things (IoT), smart home devices, etc. Providing Wi-Fi coverage for a large house or other facility including outdoor, backyard, and driveway coverage is challenging.

SUMMARY

A summary of various exemplary embodiments is presented below.

Various embodiments relate to a reconfigurable intelligent surface (RIS), including: a plurality of RIS elements including: a radio frequency identification (RFID) chip configured to power the RIS element; a RFID antenna connected to the RFID chip; a RIS variable impedance controlled by the RFID chip; and a RIS antenna connected to the RIS variable impedance, wherein the plurality of RIS elements is configured to produce a reflection beam.

Various embodiments are described, wherein the RFID chip is configured to receive a RFID signal that includes information to steer the reflection beam.

Various embodiments are described, wherein the reflection beam is steered by setting an impedance value of the RIS variable impedance based upon the information to steer the reflection beam.

Various embodiments are described, wherein the RFID chip includes a lookup table of impedance values versus angle.

Various embodiments are described, wherein the RFID chip includes a microcontroller unit (MCU) configured to control an impedance value of the RIS variable impedance.

Various embodiments are described, wherein a signal reflected by the plurality of RIS elements is a Wi-Fi signal.

Various embodiments are described, wherein the plurality of RIS elements are divided into a plurality of sections, wherein each section of RIS elements is independently controllable to produce multiple different RIS reflection beams.

Further various embodiments relate to a reconfigurable intelligent surface (RIS), including: a plurality of groups of RIS elements wherein each group includes: a first RIS element including: a radio frequency identification (RFID) chip configured to power the RIS element; a RFID antenna connected to the RFID chip; a first RIS variable impedance controlled by the RFID chip; and a first RIS antenna connected to the RIS variable impedance; a plurality of second RIS elements each RIS element including: a second RIS variable impedance controlled by the RFID chip; and a second RIS antenna connected to the RIS variable impedance; and a connection network connecting the first RIS element to each of the plurality of second RIS elements, wherein the plurality of groups of RIS elements are configured to produce a reflection beam.

Various embodiments are described, wherein the RFID chip is configured to receive a RFID signal that includes information to steer the reflection beam.

Various embodiments are described, wherein the reflection beam is steered by setting an impedance value of the first RIS variable impedance and second RIS variable impedance based upon the information to steer the reflection beam.

Various embodiments are described, wherein the RFID chip includes a lookup table of impedance values versus angle.

Various embodiments are described, wherein the RFID chip includes a microcontroller unit (MCU) configured to control an impedance value of the first RIS variable impedance and second RIS variable impedance.

Various embodiments are described, wherein a signal reflected by the plurality of RIS elements is a Wi-Fi signal.

Various embodiments are described, wherein the plurality of groups of RIS elements are divided into a plurality of sections, wherein each section of groups of RIS elements is independently controllable to produce multiple different RIS reflection beams.

Further various embodiments relate to a method of steering a reconfigurable intelligent surface (RIS) beam of a RIS, including: sending by a transmitter a sequence of unsteered sounding packets towards the RIS; setting a phased array setting of the RIS to different values from a RIS codebook for each of the sequence of sounding packets by sending a first radio frequency identification (RFID) signal to an RFID chip in the RIS; receiving information regarding the signal received by a receiver via the RIS for each of the sounding packets; selecting a phase codebook entry based upon the information regarding the signal received by a receiver; and sending a second RFID signal to the RFID chip with the selected phase codebook entry to steer the RIS beam.

Various embodiments are described, wherein the sounding packets are Wi-Fi null data packets.

Various embodiments are described, wherein the received information regarding the signal received by a receiver is a channel quality indicator.

Various embodiments are described, wherein the received information regarding the signal received by a receiver is a receive signal strength indicator.

Various embodiments are described, further including, for each of the settings in a digital codebook for the transmitter repeating the steps of: sending by a transmitter a sequence of unsteered sounding packets towards the RIS; setting phased array setting of the RIS to different values from a RIS codebook for each of the sequence of sounding packets by sending a first radio frequency identification (RFID) signal to an RFID chip in the RIS; and receiving information regarding the signal received by a receiver via the RIS for each of the sounding packets, selecting a digital codebook entry based upon the information regarding the signal received by the receiver.

Various embodiments are described, wherein the sounding packets are Wi-Fi null data packets; and the received information regarding the signal received by a receiver is one of a channel quality indicator and a receive signal strength indicator.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
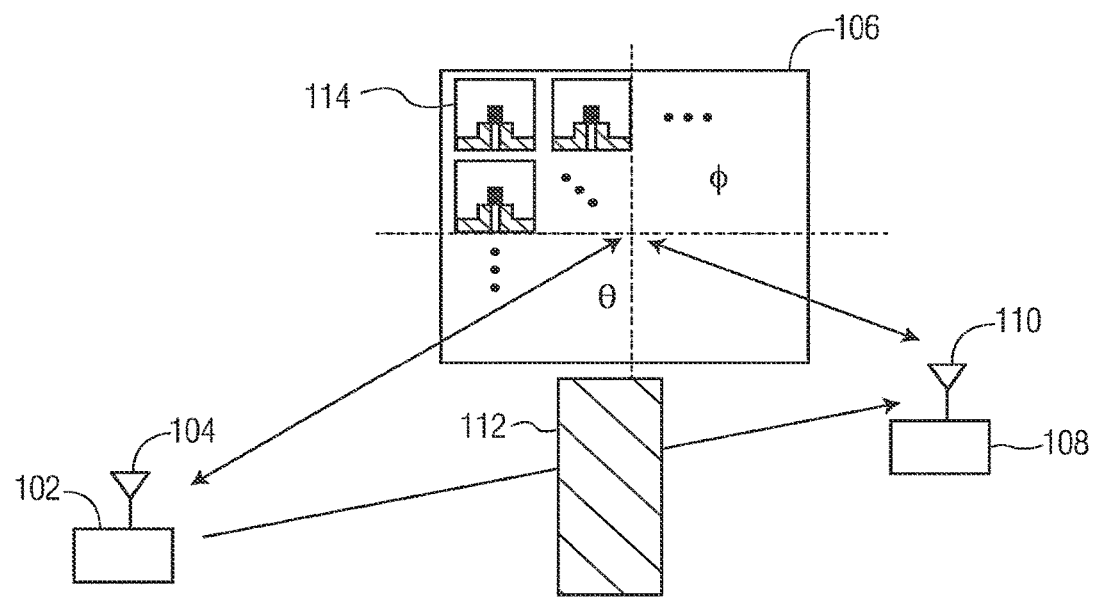
FIG. 1 illustrates the use of RIS to improve communication between an AP and a user.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of reconfigurable intelligent surface (RIS) systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

A reconfigurable intelligent surface (RIS) is a programmable surface structure that may be used to control the reflection of electromagnetic (EM) waves by changing the electric and magnetic properties of the surface. These surfaces may be strategically placed in the radio channel between a transmitter and receiver to control the way the signal reflects off a surface in its propagation path. Reconfigurable intelligent surfaces may be used to steer signals to the receiver resulting in better reception or link quality.

In conventional wireless systems, the radio channel is seen as an uncontrollable entity that usually distorts transmitted signals. The transmitted signals usually interact with a wide range of surfaces in their propagation path and reflect off them in random directions resulting in random constructive and destructive interference. A RIS provides a way to control the surfaces found in radio channels by directing them in a specific direction to improve the reliability and energy efficiency of wireless systems. This can increase the range of a wireless system and direct signals to hard-to-reach places. An antenna array may be used to implement a RIS to control the characteristics of signals (e.g., reflection, refraction, absorption, focusing and polarization).

The use of scalable RIS with an RFID array is proposed in this disclosure. In a conventional RIS, on-or-off only passive antenna switching, such as Pin-diodes or external switches, are used for backscattering in the RIS antenna array while a centralized controller with massive distributed control routing is required to control each element of the RIS. Both on-or-off only passive switching antennas and the centralized controller limits the scaling of the size of the RIS, and it eventually reduces the benefit of the RIS. This RIS architecture with RFID array proposed herein provides a distributed controlling scheme that is self-powered from wireless power harvesting and implements fine antenna impedance modulation. These improvements enable a scalable RIS architecture to further improve the range and throughput of the wireless communication system such as Wi-Fi, BlueTooth (BT), ultra-wideband (UWB), etc. . . .

In this disclosure, a Wi-Fi system will be used to describe the proposed scalable RIS, but the scalable RIS disclosed herein may be applied to other types of wireless communication systems.

Wi-Fi systems sometimes are unable to provide the wireless coverage a user needs. Various solutions include using mesh routers and a repeater or extender. Mesh routers are multi-hop communication systems that may induce high latency and reduced network throughput. Further a dual-chip/dual-radio design may be needed in a mesh access point (AP) that increases cost, complexity, and power consumption. The repeater or extender solution has similar challenges as the mesh system. Accordingly, another solution to address these challenges may include the use of RIS.

FIG. 1 illustrates the use of RIS to improve communication between an AP and a user. An AP 102 is in communication with a user STA 108. The obstacle 112 is in the line-of-sight between the AP 102 and user STA 108, and the obstacle 112 greatly reduces the signal received by the user STA 108 from the AP 102. A RIS 106 may be used to improve the communication between the AP 102 and user STA 108. The AP antenna 104 emits a signal that propagates towards the RIS 106. The RIS 106 may be configured to form a reflection beam towards the user antenna 110. This may be done by setting the phase on the various RIS elements 114 to form a beam in the direction of the user antenna 110. The RIS 106 may be used in other applications as well including, for example, range extension, filling in dead spots, etc.

Figure 2:
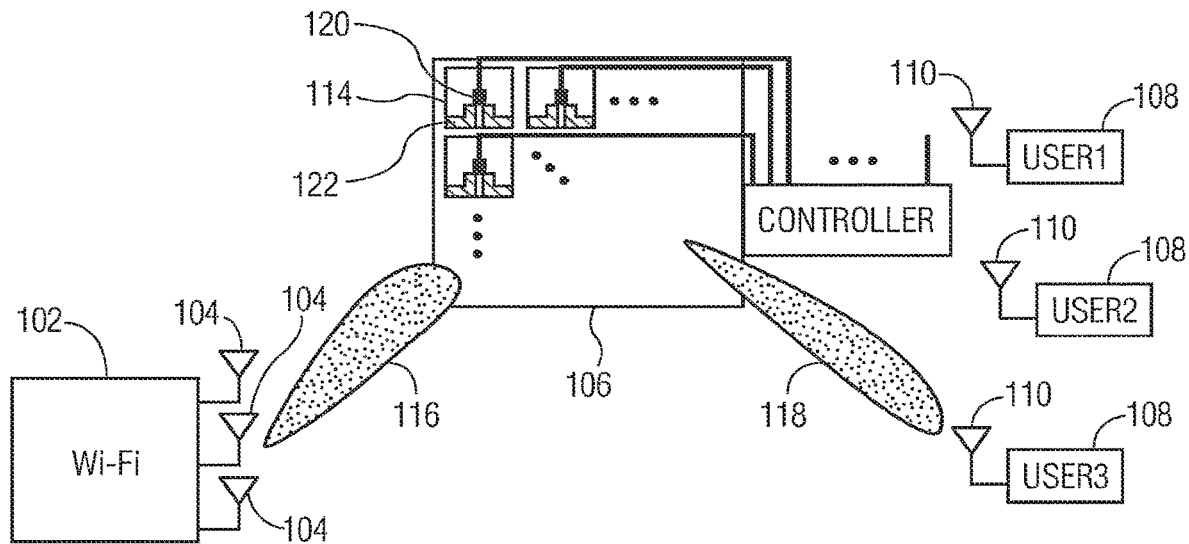
FIG. 2 illustrates the use of a RIS in more detail.

FIG. 2 illustrates the use of a RIS in more detail. In this example, the AP 102 may include a plurality of AP antennas 104 that allow for the formation of a steerable Wi-Fi beam 116. The AP 102 may form and steer the Wi-Fi beam 116 towards the RIS 106. The AP 102 may communicate with a plurality of user STAs 108. A controller 124 may control the RIS 106 to form a RIS beam 118 that is pointed at one of the plurality of users STA 108. The controller 124 has a control connection with each of the RIS elements 114 in the RIS 106. The controller 124 may send a control signal that indicates the phase status of each of the RIS elements 114 in order to form and steer the RIS beam 118 towards the desired user STA 108. Further, controller 124 may provide power to the RIS elements 114.

The RIS 106 has a number of problems. The RIS 106 requires MXN control wires that limits the size of the RIS due to the complexity of the routing the control signals which means that implementing a large array size may be difficult. Implementing electrically small antennas such as meta-surface will be difficult. An external battery or other power source is required to power up the controller/array. An external signal is required to control the controller either using a wired or wireless connection. Typically, the impedance of each antenna is either on or off by using a RF-switch or diode. It is difficult to reconfigure each RIS element antenna impedance Z to a desired value. Further, this approach does not easily allow for processing or manipulation of the incident RF-Signal in each antenna.

Figure 3:
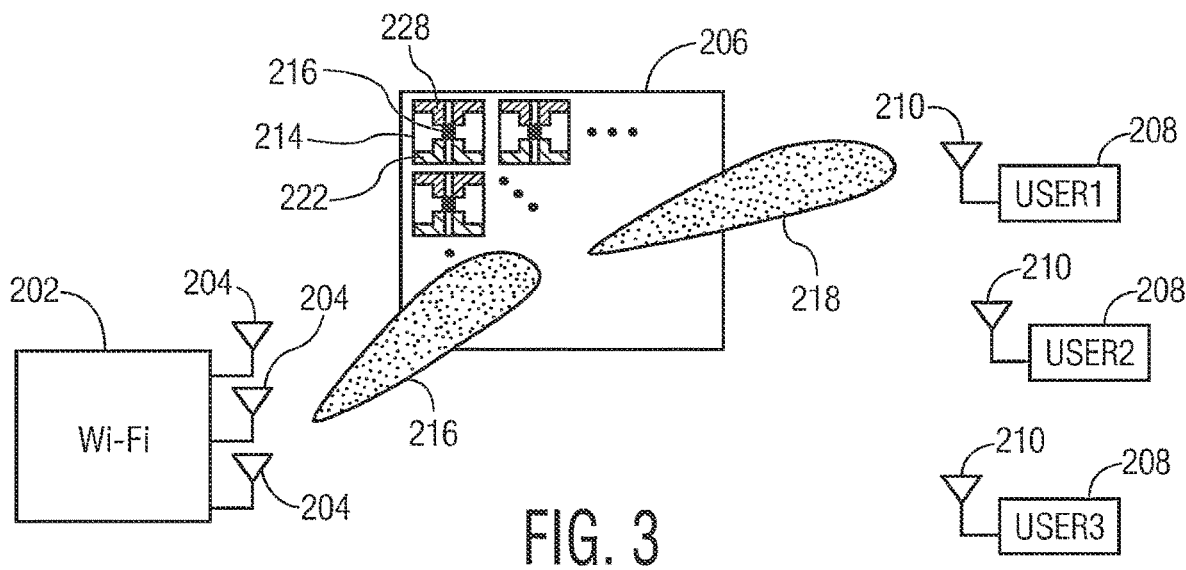
FIG. 3 illustrates an embodiment of a RIS using an RFID chip.
Figure 4:
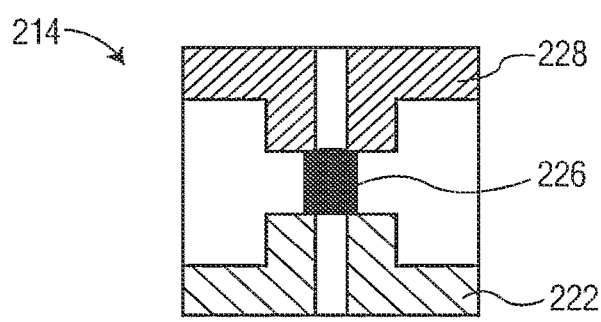
FIG. 4 illustrates an embodiment of the RIS element.
Figure 5:
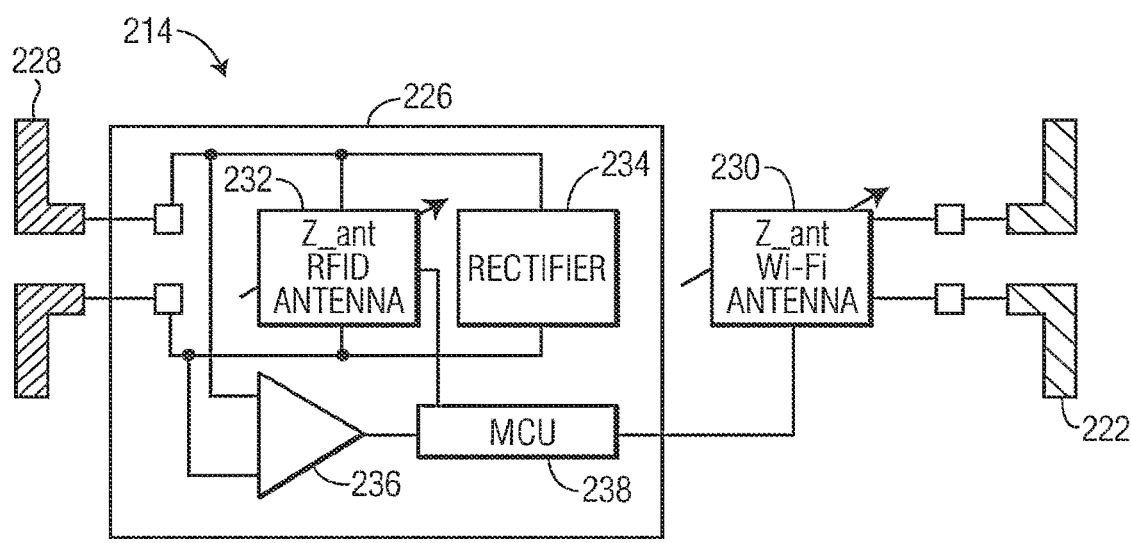
FIG. 5 illustrates a block diagram of the RIS element.

FIG. 3 illustrates an embodiment of a RIS using an RFID chip. FIG. 3 illustrates an AP 202 communicating to user STAs 208 using a RIS 206. The AP 202 uses AP antennas 204 to form Wi-Fi beam 216 pointed at the RIS 206. The RIS reflects the signal from the AP 202 via the Wi-Fi beam 216 towards one of the user STAs 208 by forming and steering a RIS beam 218. The RIS 206 includes a plurality of RIS elements 214. The RIS elements 214 include an RFID chip 226. FIG. 4 illustrates an embodiment of the RIS element 214. The RIS element 214 includes a RIS element antenna 222, RFID chip 226, and a RFID antenna 228. FIG. 5 illustrates a block diagram of the RIS element 214. The RFID chip 226 includes a RFID antenna variable impedance 232, rectifier 234, envelope detector 236, and microcontroller unit (MCU) 238. The RFID chip 226 is connected to the RFID antenna 228. The RFID antenna 228 receives an RFID signal that provides data and power to the RFID chip 226. A RFID antenna variable impedance 232 is set to create a resonate circuit with the RFID antenna 228 to maximize power harvesting. Then the input signal is fed to the rectifier 234 that rectifies the input signal and produces power. This power may then be applied to the envelope detector 236 and MCU 238 to turn on the envelope detector 236 and MCU 238. The envelope detector 236 detects the envelope of the received RFID signal where the envelope of the RFID signal carries modulated information. The envelope detector 236 produces a data stream carried by the RFID signal to the MCU 238. The received RFID information may include information regarding the direction that the RFID chip 226 should form the RIS beam 218. This can then be used to control a Wi-Fi antenna variable impedance 230 to set an impedance value that will aid in steering and forming the RIS beam 218.

In operation, the RIS 206 first receives an RFID signal that is used to set the value for the Wi-Fi antenna variable impedance 230. Once the impedance value for the Wi-Fi antenna variable impedance 230 is set, then the AP 202 may send Wi-Fi signals that will be reflected off of the RIS 206 towards a desired user STA 208.

In another embodiment of the RIS, a battery may be used to power the MCU 238 and the Wi-Fi antenna variable impedance 230. In this situation the MCU 238 may remain in a sleep mode with very low power consumption, and the MCU 238 may then wake up only when an RFID signal is received including a new configuration command for the RIS.

The RIS element antenna 222 may be a wideband antenna that covers the frequency range of the signal to be reflected. For Wi-Fi this may be from 2.4 GHz to 7 GHz. For other communication protocols the bandwidth would be set to accommodate the frequencies used. In this example a standard 900 MHz RFID signal may be used. Other transmission frequencies may be used for the RFID signal based upon the power harvesting needs and the available transmit signals.

The RFID chip 226 may use a lookup table that maps an angle of the RIS beam 218 to a specific impedance value that may be produced by the Wi-Fi antenna variable impedance 230. Table 1 below illustrates such a lookup table for an angular resolution of 45°.

TABLE 1

| Angle | Z_Ant Wi-Fi (Ω) |
|---|---|
| 0 | 150 |
| 45 | 69.1 + 65.1i |
| 90 | 30 + 40.0i |
| 135 | 19.16 + 18.06i |
| 180 | 16.67 + 0i |
| 225 | 19.16 − 18.0651i |
| 270 | 30 − 40i |
| 315 | 69.1 − 65i |

In the example of Table 1 three-bit values may be used to select among the eight different impedance values. While 45° increments are shown for Table 1, larger or smaller increments may be selected as well. The lookup table becomes a phase codebook that is used to control the direction of the RIS beam 218.

The RIS 206 overcomes the problems associated with the RIS 106 of FIG. 1. The need for complicated wired connections to each RIS element 114 has been removed by having the RFID chip 226 provide the control information to the RIS element 214. This may be done wirelessly using existing RFID technology. Further, a separate power supply is not needed to configure the RIS 206 because the RFID chip 226 harvests power from the RFID signal to power the RIS element 214 and to set the needed impedance value for form and steer the RIS beam 218. This means that the RIS 206 may be scaled to be larger and to include larger numbers of RIS elements 214. A larger RIS 206 improves the gain of the RIS beam 218 as well as allowing for a narrower RIS beam 218.

Figure 6A:
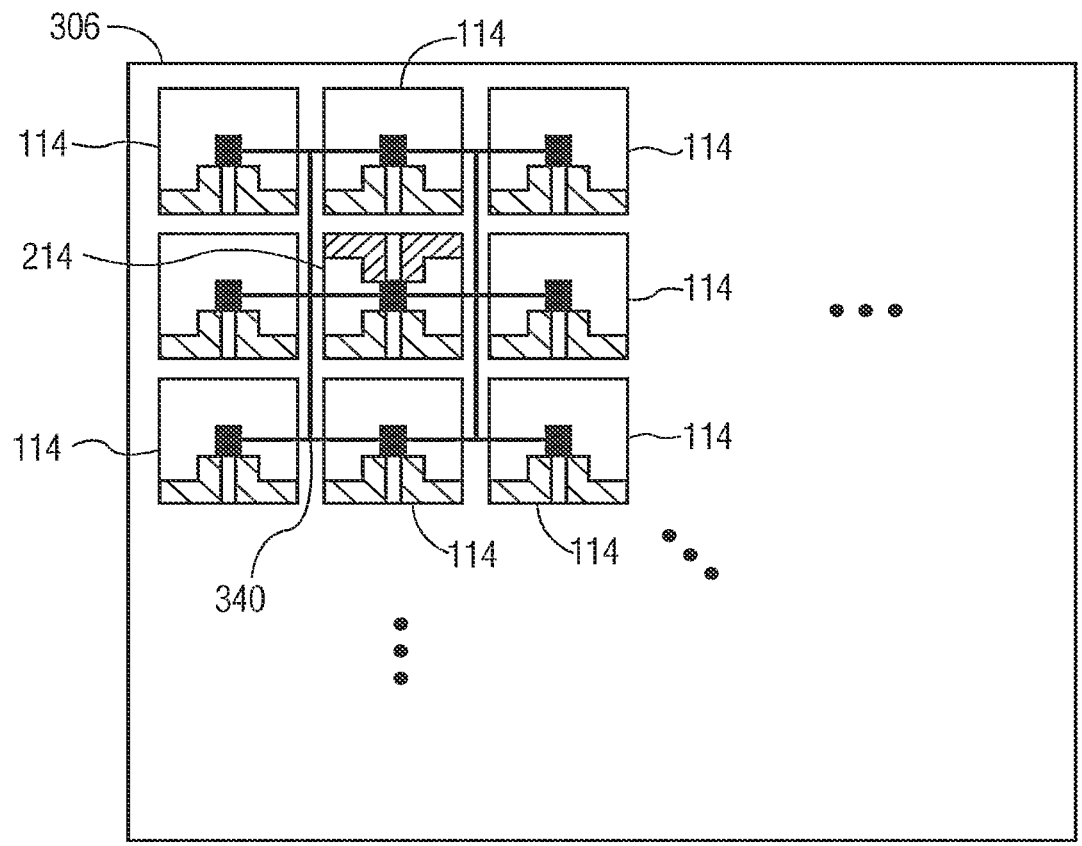
FIG. 6A illustrates a second embodiment of a RIS using a RFID chip.

FIG. 6A illustrates a second embodiment of a RIS using a RFID chip. In the RIS 306 two different types of RIS elements may be used and combined to form N×N groups. In the N×N group, one RIS element 214 may include a RFID chip 226. Then the remaining N×N-1 RIS elements 114 do not include an RFID chip 226 or the RFID antenna 228. The RFID chip 226 is then connected to Wi-Fi antenna variable impedances 230 in the other N×N-1 RIS elements 114, and the RFID chip 226 controls the impedance of the Wi-Fi antenna variable impedances 230.

This may be accomplished using RFID connections 340. The RFID connections 340 form a connection network. This approach allows for fewer RFID chips 226 and RFID antennas 228 to be used. Further, the N×N groups could instead be N×M groups. Also, the RIS 306 is illustrated as having RIS elements that are aligned in a grid, but they may be arranged in other ways as well. For example, the lines of the grid may be offset from one another. Also, the RIS elements without a RFID chip 226 may be arranged around the RIS element with a RFID chip 226 in a hexagonal or diamond shape. In another embodiment, the group of RIS elements may include two or more RIS elements with a RFID chip.

Figure 6B:
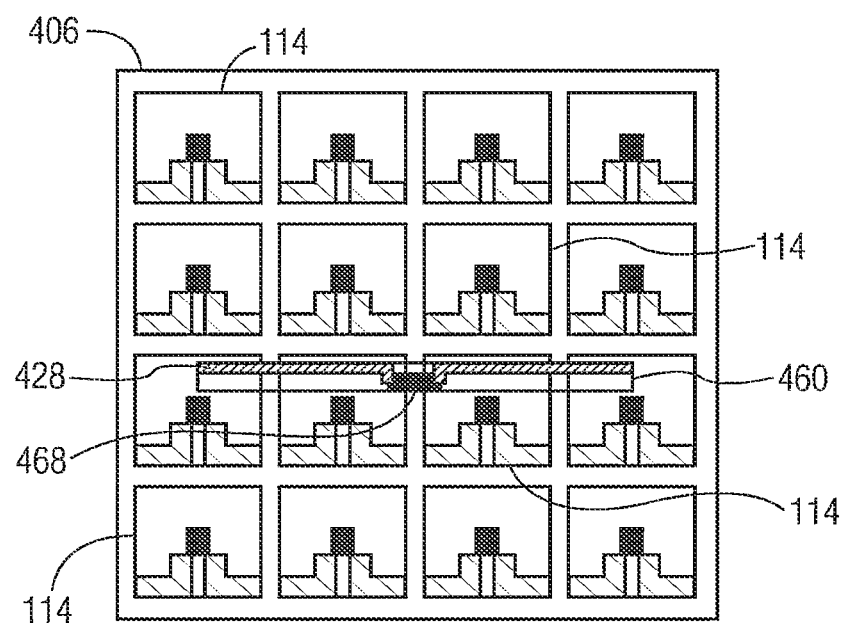
FIG. 6B illustrates a third embodiment of a RIS using a RFID chip.
Figure 6C:
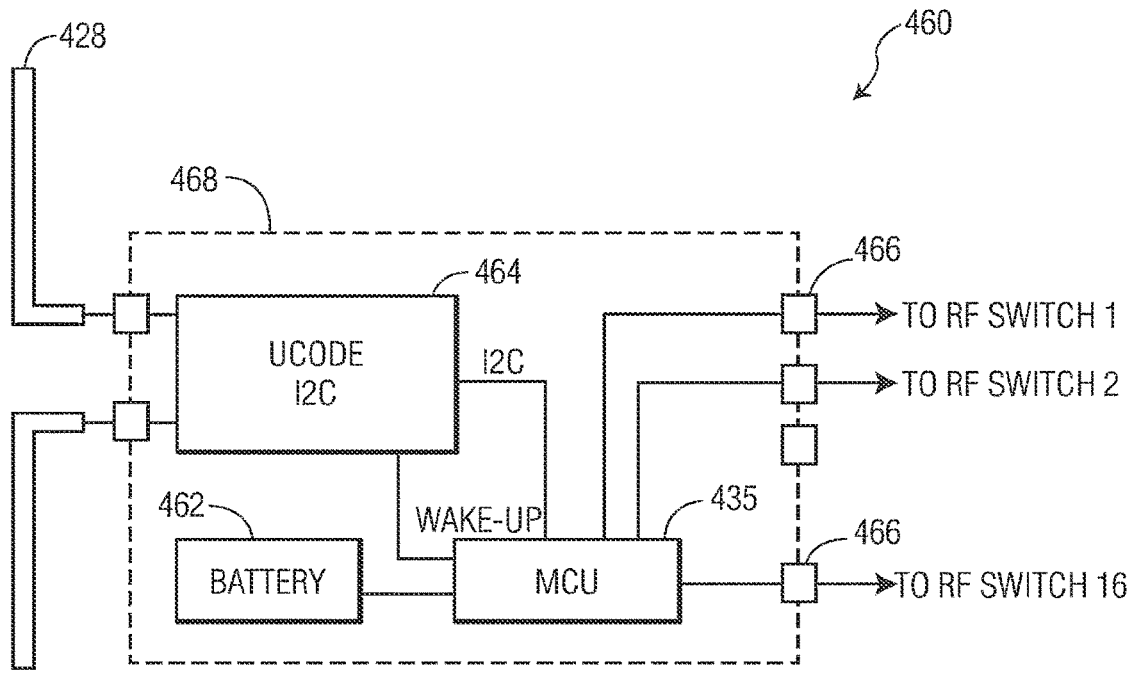
FIG. 6C illustrates another embodiment of a RIS element.

FIG. 6B illustrates a third embodiment of a RIS using an RFID chip. FIG. 6C illustrates another embodiment of a RIS element found in FIG. 6B. The RIS element 460 in FIG. 6B is larger than the RIS element 114. This allows for a larger RFID antenna 428 which improves energy harvesting and the reliability of the communication link to the RFID chip 468. The RFID chip 468 includes a UCODE I2C circuit 464, battery 462, and MCU 438. The UCODE I2C circuit 464 receives the signal received by the RFID antenna 428 and provides it to the MCU and also may harvest power. The MCU 438 operates like the microcontroller unit MCU 238 described above. The battery 462 provides power or additional power to power the RFID chip 468. This may include powering the MCU 438 and the Wi-Fi antenna variable impedances 230 in the various RIS elements 114. The MCU 438 determines the control signal for each of the associated RIS elements 114 and is connected to RF switch connector 466 to provide control signal to each of the various RIS elements 114.

Figure 7:
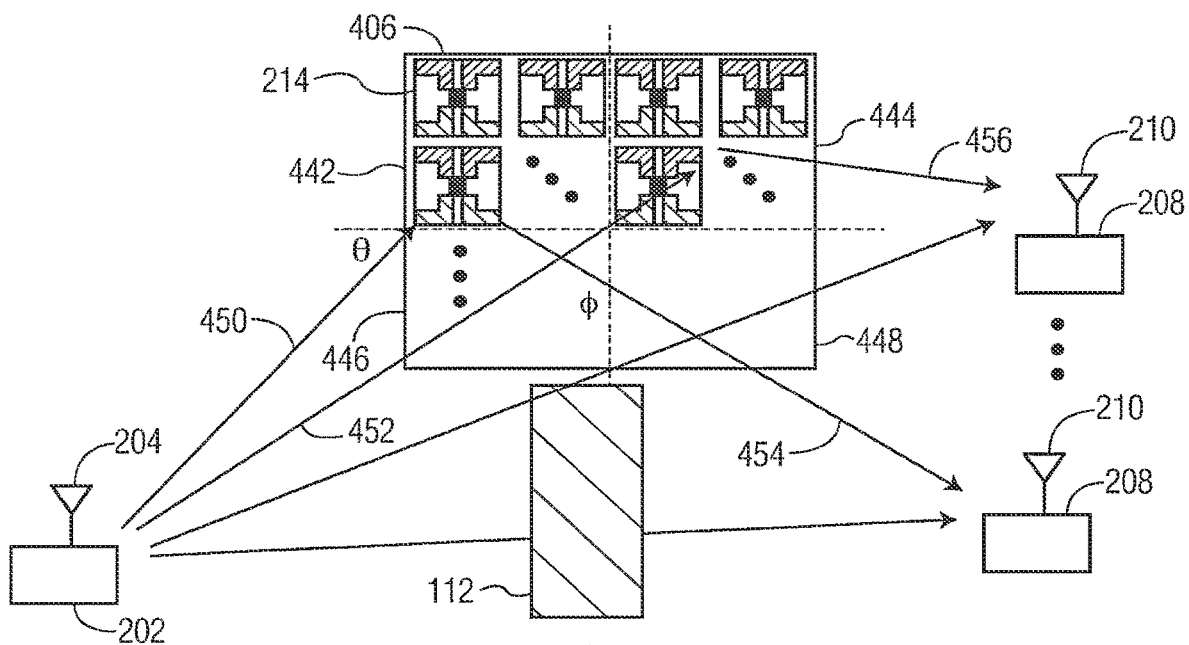
FIG. 7 illustrates a fourth embodiment of a RIS using a RFID chip.

FIG. 7 illustrates a fourth embodiment of a RIS using a RFID chip. In this case, the RIS 306 may be divided into four sections 442, 444, 446, and 448. Each of these sections may be independently controlled to form multiple independent RIS reflection beams. For example, the RFID signal may include an angle to be used by each RIS element 214 associated with each section used to form and steer a RIS beam. This is useful when the AP 202 is using multi-input multi-output (MIMO) mode to form multiple different reflection beams for communicating with multiple user STAs 208. For example, the AP 202 produces a first MIMO beam 450 for a first user STA 208 and a second MIMO beam 452 for a second user STA 208. The first MIMO beam 450 is reflected by the first section 442 to produce first RIS beam 454 that is pointed at the first user STA 208. The second MIMO beam 452 is reflected by the second section 444 to produce second RIS beam 456 that is pointed at the second user STA 208. It is noted that in this example, the third section 446 may be used in conjunction with the first section 442 to reflect the first MIMO beam 450 and to form first RIS beam 454. Likewise, the fourth section 448 may be used in conjunction with the second section 444 to reflect the second MIMO beam 452 and to form second RIS beam 456. This means that the RIS 406 may be used to improve the function of AP 202 that is using MIMO operation.

Figure 8:
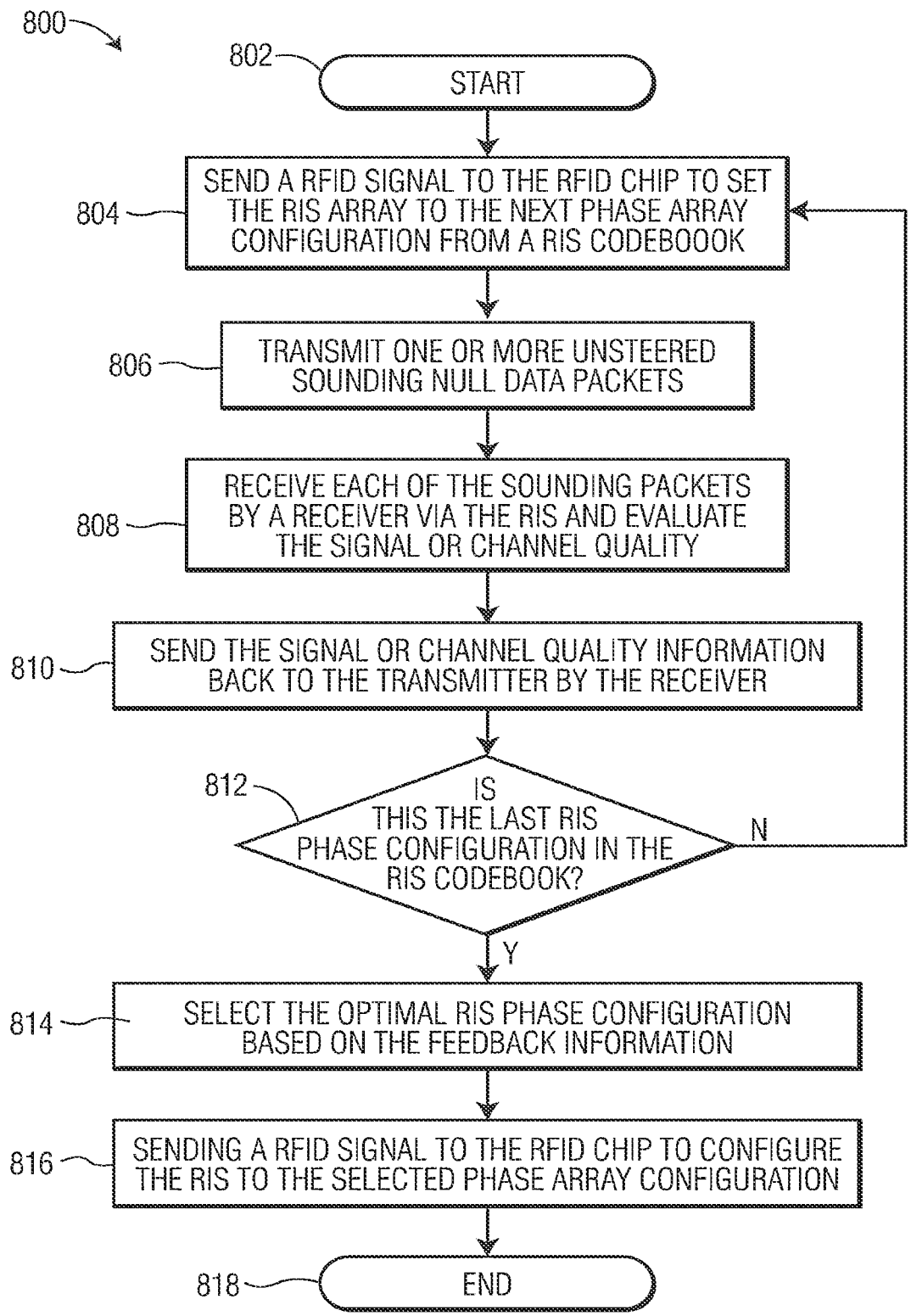
FIG. 8 illustrates an embodiment of a first RIS beam steering algorithm.

The RIS array may steer the incoming signal to form a narrow beam to the user STA or area (i.e., to cover a dead zone) by changing the phase of each RIS reflected signal. FIG. 8 illustrates an embodiment of a first RIS beam steering algorithm 800. The RIS phased antenna array steering phase is trained/optimized for a specific STA/location. The optimal RIS phase array configuration is obtained by looping through the predefined RIS phase codebook and comparing the corresponding signal or channel quality for each configuration. The RIS phase codebook includes a set of predefined phase setting of each RIS element. The beam steering algorithm 800 starts at 802. The first RIS beam steering algorithm 800 sends a RFID signal to the RFID chip to set the RIS array to the next phase configuration 804. In one embodiment, the RFID signal indicates the impedance of the Wi-Fi antenna variable impedance 230 at 806. Then the Wi-Fi Tx transmits one or more unsteered sounding Null Data Packets (NDP) to the receiver 806. The receiver computes the received Channel Quality Indicator (CQI) or the Receive Signal Strength Indicator (RSSI) for the corresponding RIS phase array setting 808 and feed back to the Wi-Fi TX at the end of each NDP or the sequence of NDPs at 8010 The first RIS beam steering algorithm 800 determines if the current RIS phase configuration is the last one in the RIS codebook 812, and if not loops back to step 804 to loop through all or partial entries in the RIS phase array, and the Wi-Fi TX collects all the CQI/RSSI information. The Wi-Fi TX selects the optimal phase array setting with the best CQI/RSSI 814 and sends the choice to the RIS array via the RFID chip 816. The beam steering algorithm 800 ends at 818. The Wi-Fi TX may periodically initiate a RIS steering training process to ensure codebook choice is up to date. The TX may perform periodic iterations of the RIS beam steering algorithm based on the trained effective optimal Tx-RIS-Rx channel at 812. Regular Wi-Fi sounding and MIMO beamforming may be performed with the optimal RIS array to steer the data PPDU.

Figure 9:
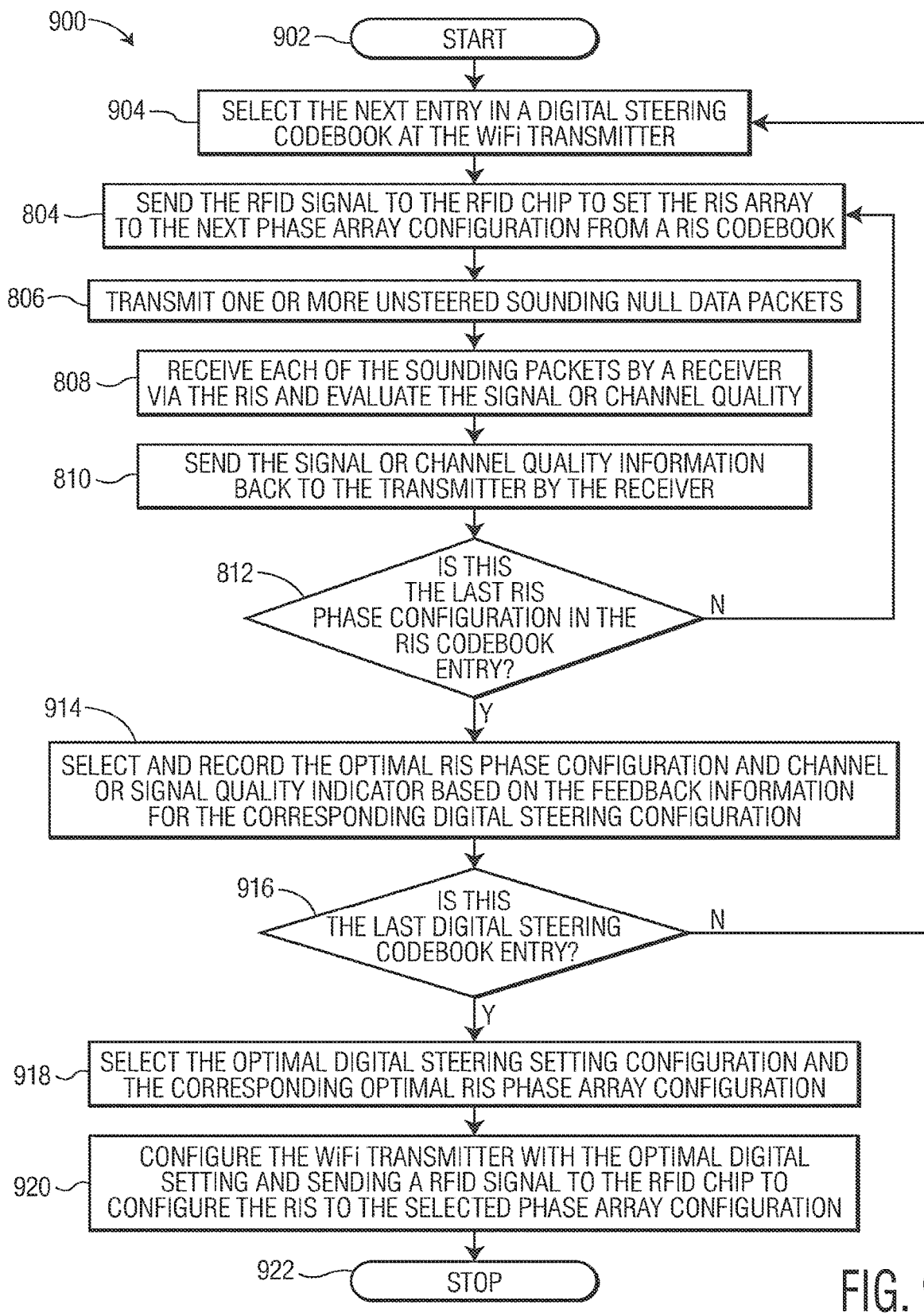
FIG. 9 illustrates a second embodiment of a RIS beam steering algorithm.

FIG. 9 illustrates a second embodiment of a RIS beam steering algorithm 900. In addition to the RIS steering training described above with respect to the first algorithm (i.e., steps 804-812 are described above), the training in the second algorithm is done in two loops to jointly optimize the WiFi digital beamforming and the RIS array phase setting. The Wi-Fi TX predefines a digital steering codebook that is used to steer the digital signal to the receiver. The codebook can be chosen based on disturbances from the optimal steering matrix obtained based on the default RIS phase array setting. For each setting in the digital steering codebook, a RIS training is performed as described by the first beam steering algorithm. At step 904 the next entry in the digital steering codebook is selected. Then at step 916 the beam steering algorithm 900 determines if the end of the digital steering codebook has been reached. The Wi-Fi Tx sends a sequence of steered sounding NDPs to the destination STA 806, and the RIS runs through the codebook sequence correspondingly 804-812. The destination STA feeds back the CQI/RSSI 810. The RIS beam steering algorithm 900 selects and records the optimal RIS setting and CQI/RSSI for each digital steering codebook entry 914. After all information is collected, the Wi-Fi Tx will choose the combined optimal digital beamforming setting and RIS phase array setting in the codebook with the best CQI/RSSI during operation to use to steer the RIS beam 218 at 918. The RIS beam steering algorithm 900 then configures the WiFi transmitter with the optimal digital setting and sends a RFID signal to the RFID chip to configure the RIS to the selected phase array configuration 920. The beam steering algorithm 900 ends at 914.

The foregoing disclosure provides illustration and description but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like. It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, the term "non-transitory machine-readable storage medium" will be understood to exclude a transitory propagation signal but to include all forms of volatile and non-volatile memory. When software is implemented on a processor, the combination of software and processor becomes a specific dedicated machine.

Because the data processing implementing the embodiments described herein is, for the most part, composed of electronic components and circuits known to those skilled in the art, circuit details will not be explained in any greater extent than that considered necessary as illustrated above, for the understanding and appreciation of the underlying concepts of the aspects described herein and in order not to obfuscate or distract from the teachings of the aspects described herein.

Unless stated otherwise, terms such as "first" and "second" are used to arbitrarily distinguish between the elements such terms describe. Thus, these terms are not necessarily intended to indicate temporal or other prioritization of such elements.

It should be appreciated by those skilled in the art that any block diagrams herein represent conceptual views of illustrative hardware embodying the principles of the aspects.

While each of the embodiments are described above in terms of their structural arrangements, it should be appreciated that the aspects also cover the associated methods of using the embodiments described above.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

The invention claimed is:

1. A reconfigurable intelligent surface (RIS), comprising:
a plurality of RIS elements comprising:
a radio frequency identification (RFID) chip configured to power the RIS element;
a RFID antenna connected to the RFID chip;
a RIS variable impedance controlled by the RFID chip; and
a RIS antenna connected to the RIS variable impedance,
wherein the plurality of RIS elements is configured to produce a reflection beam.

2. The RIS of claim 1, wherein the RFID chip is configured to receive a RFID signal that includes information to steer the reflection beam.

3. The RIS of claim 2, wherein the reflection beam is steered by setting an impedance value of the RIS variable impedance based upon the information to steer the reflection beam.

4. The RIS of claim 3, wherein the RFID chip includes a lookup table of impedance values versus angle.

5. The RIS of claim 1 wherein the RFID chip includes a microcontroller unit (MCU) configured to control an impedance value of the RIS variable impedance.

6. The RIS of claim 1, wherein the reflection beam comprises a reflected Wi-Fi signal.

7. The RIS of claim 1, wherein the plurality of RIS elements are divided into a plurality of sections, wherein each section of RIS elements is independently controllable to produce multiple different RIS reflection beams.

8. A reconfigurable intelligent surface (RIS), comprising:
a plurality of groups of RIS elements wherein each group comprises:
a first RIS element including:
a radio frequency identification (RFID) chip configured to power the RIS element;
a RFID antenna connected to the RFID chip;
a first RIS variable impedance controlled by the RFID chip; and
a first RIS antenna connected to the RIS variable impedance;
a plurality of second RIS elements each RIS element including:
a second RIS variable impedance controlled by the RFID chip; and
a second RIS antenna connected to the RIS variable impedance; and
a connection network connecting the first RIS element to each of the plurality of second RIS elements, wherein the plurality of groups of RIS elements are configured to produce a reflection beam.

9. The RIS of claim 8, wherein the RFID chip is configured to receive a RFID signal that includes information to steer the reflection beam.

10. The RIS of claim 9, wherein the reflection beam is steered by setting an impedance value of the first RIS variable impedance and second RIS variable impedance based upon the information to steer the reflection beam.

11. The RIS of claim 10, wherein the RFID chip includes a lookup table of impedance values versus angle.

12. The RIS of claim 8, wherein the RFID chip includes a microcontroller unit (MCU) configured to control an impedance value of the first RIS variable impedance and second RIS variable impedance.

13. The RIS of claim 8, wherein the reflection beam comprises a reflected Wi-Fi signal.

14. The RIS of claim 8, wherein the plurality of groups of RIS elements are divided into a plurality of sections, wherein each section of groups of RIS elements is independently controllable to produce multiple different RIS reflection beams.

15. A method of steering a reconfigurable intelligent surface (RIS) beam of a RIS, comprising:
   sending by a transmitter a sequence of unsteered sounding packets towards the RIS;
   setting a phased array setting of the RIS to different values from a RIS codebook for each of the sequence of sounding packets by sending a first radio frequency identification (RFID) signal to an RFID chip in the RIS;
   receiving information regarding the signal received by a receiver via the RIS for each of the sounding packets;
   selecting a phase codebook entry based upon the information regarding the signal received by a receiver; and
   sending a second RFID signal to the RFID chip with the selected phase codebook entry to steer the RIS beam.

16. The method of claim 15, wherein the sounding packets are Wi-Fi null data packets.

17. The method of claim 15, wherein the received information regarding the signal received by a receiver is a channel quality indicator.

18. The method of claim 15, wherein the received information regarding the signal received by a receiver is a receive signal strength indicator.

19. The method of claim 15, further comprising,
   for each of the settings in a digital codebook for the transmitter repeating the steps of:
      sending by a transmitter a sequence of unsteered sounding packets towards the RIS;
      setting phased array setting of the RIS to different values from a RIS codebook for each of the sequence of sounding packets by sending a first radio frequency identification (RFID) signal to an RFID chip in the RIS; and
      receiving information regarding the signal received by a receiver via the RIS for each of the sounding packets,
   selecting a digital codebook entry based upon the information regarding the signal received by the receiver.

20. The method of claim 15, wherein
   the sounding packets are Wi-Fi null data packets; and
   the received information regarding the signal received by a receiver is one of a channel quality indicator and a receive signal strength indicator.

* * * * *